United States Patent [19]

Murakami

[11] Patent Number: 4,917,792

[45] Date of Patent: Apr. 17, 1990

[54] AUTOMATIC TRANSACTION TERMINAL HAVING MEANS FOR PRESETTING THE DENOMINATIONS OF NOTES STORED IN A PLURALITY OF NOTE CARTRIDGES

[75] Inventor: Hiroyoshi Murakami, Moriyama, Japan

[73] Assignee: Omron Tateisi Electronics Co., Kyoto, Japan

[21] Appl. No.: 12,155

[22] Filed: Feb. 9, 1987

[30] Foreign Application Priority Data

Feb. 10, 1986 [JP] Japan ................................ 61-27298

[51] Int. Cl.$^4$ ........................ B07C 5/36; G06F 15/30

[52] U.S. Cl. .................................. 209/534; 235/379; 902/11; 902/12

[58] Field of Search ....................... 209/534; 235/379; 194/206; 902/11-13

[56] References Cited

U.S. PATENT DOCUMENTS

| | | | |
|---|---|---|---|
| 4,273,649 | 6/1981 | Leverett | 209/912 X |
| 4,299,326 | 11/1981 | Ulch | 209/592 X |
| 4,337,393 | 6/1982 | Hilton | 235/487 |
| 4,524,268 | 6/1985 | Fukatsu | 209/534 X |
| 4,577,763 | 3/1986 | Placke et al. | 209/534 |
| 4,670,643 | 6/1987 | Hain et al. | 235/379 |
| 4,787,518 | 11/1988 | Yuge et al. | 209/534 |
| 4,808,801 | 2/1989 | Nakagawa | 235/379 |

*Primary Examiner*—Margaret A. Focarino
*Assistant Examiner*—Edward M. Wacyra
*Attorney, Agent, or Firm*—Stevens, Davis, Miller & Mosher

[57] ABSTRACT

An automatic transaction terminal has a plurality of cartridges for storing notes and preset key switches for presetting a pattern of denominations of the notes to be stored in the cartridges so that the respective cartridges may be selectively designated by the preset key switches to store the notes corresponding to the denomination preset by the preset key switches. In a deposit transaction, the deposited note is reviewed by a discriminating unit to determine its denomination and stored into the cartridge corresponding to the denomination reviewed by the discriminating unit which is preset by the key switches. In a withdrawal transaction, the notes are fed out from the cartridge preset by the key switches as having the denominations corresponding to the denomination requested by the customer.

3 Claims, 6 Drawing Sheets

6

| | | | | | |
|---|---|---|---|---|---|
| A | OLD | $50 | $10 | $100 | 61 |
| B | OLD | $50 | $10 | $100 | 62 |
| C | OLD | $50 | $10 | $100 | 63 |
| D | OLD | $50 | $10 | $100 | 64 |

65

| | | | |
|---|---|---|---|
| OLD | $50 | $10 | $100 |

66

| | |
|---|---|
| $10 | $100 |

AUTOMATIC TRANSACTION TERMINAL HAVING MEANS FOR PRESETTING THE DENOMINATIONS OF NOTES STORED IN A PLURALITY OF NOTE CARTRIDGES

BRIEF SUMMARY OF THE INVENTION

This invention relates to automatic transaction terminals which may issue cash, receive cash, transfer funds or execute other requested transactions and more particularly to automatic transaction terminals having a plurality of cartridges for storing bank notes or documents therein for the respective denominations.

Automatic transaction terminals are currently available which include bank note cartridges for storing bank notes for each denomination and unauthentic bank notes, in which deposited notes are sorted about the denominations by a discriminating device to be stored in the cartridges corresponding to the sorted denominations.

The denominations of the bank notes to be stored in the respective cartridges are preset by a program stored in the terminal, so that in order to change the denominations assigned to the cartridges the stored program has to be changed. Generally, the automatic transaction terminals including cash dispensers for issuing cash which are installed into the same banking facilities have the same program stored therein, whereby the denominations assigned to the cartridges cannot be changed easily even in the same banking facilities. For instance, in the same banking facilities serving the living and commercial areas, such terminals are not readily adaptable to increase the number of bank note cartridges for withdrawal or deposit transactions, viz. to change the denominations assigned to the cartridges, according to the frequency of transactions requested by customers in areas or days although such flexible change of cartridges is necessary to improve bank service.

Accordingly, a feature of this invention is to provide an automatic transaction terminal wherein the denominations of bank notes to be stored within the respective bank note storage or cartridges are readily adaptable to change.

A further feature of this invention is to provide an automatic transaction terminal wherein a bank clerk may readily perform such denomination change of the cartridges without changing any stored program stored in the terminal.

An automatic transaction terminal in accordance with this invention is provided with a setting switch which is designed to change the denominations assigned to a plurality of bank note cartridges.

The automatic transaction terminal includes a plurality of bank note cartridges for storing bank notes for respective denominations, note distributing means for storing the deposited notes in the respective cartridges and feeding out the stored notes therefrom, and preset switch means for selectively presetting a pattern of denominations of the notes to be stored in the respective cartridges, in which each of the cartridges may store or feed out the note having the denomination preset by the preset switch means through the note dispensing means.

For a more complete understanding of the invention and its advantages, reference may now be had to the following description taken in conjunction with the accompanying drawings in which:

DETAILED DESCRIPTION

Figure 1:
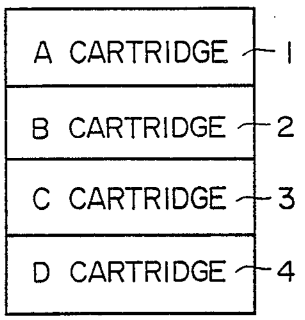
FIG. 1 is a schematic block diagram of an example of a plurality of bank note cartridges employed in an automatic transaction terminal in accordance with a preferred embodiment of this invention.
Figure 2:
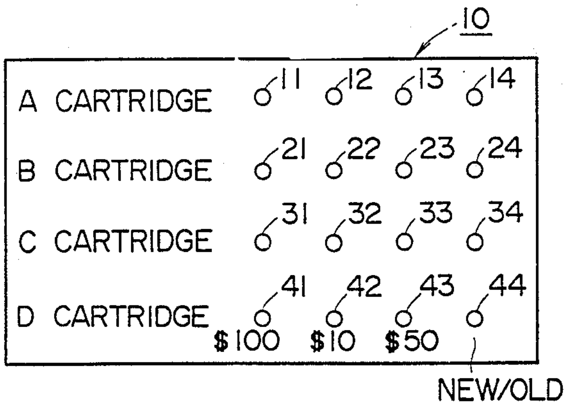
FIG. 2 is a schematic front view of a preset switch panel to assign denominations to the respective cartridges of FIG. 1.
Figure 6:
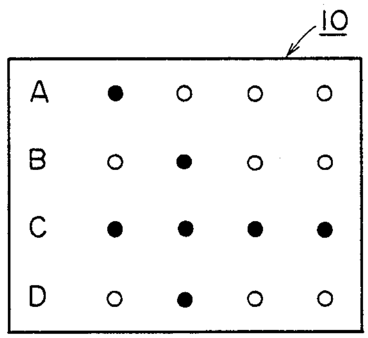
Figure 7:
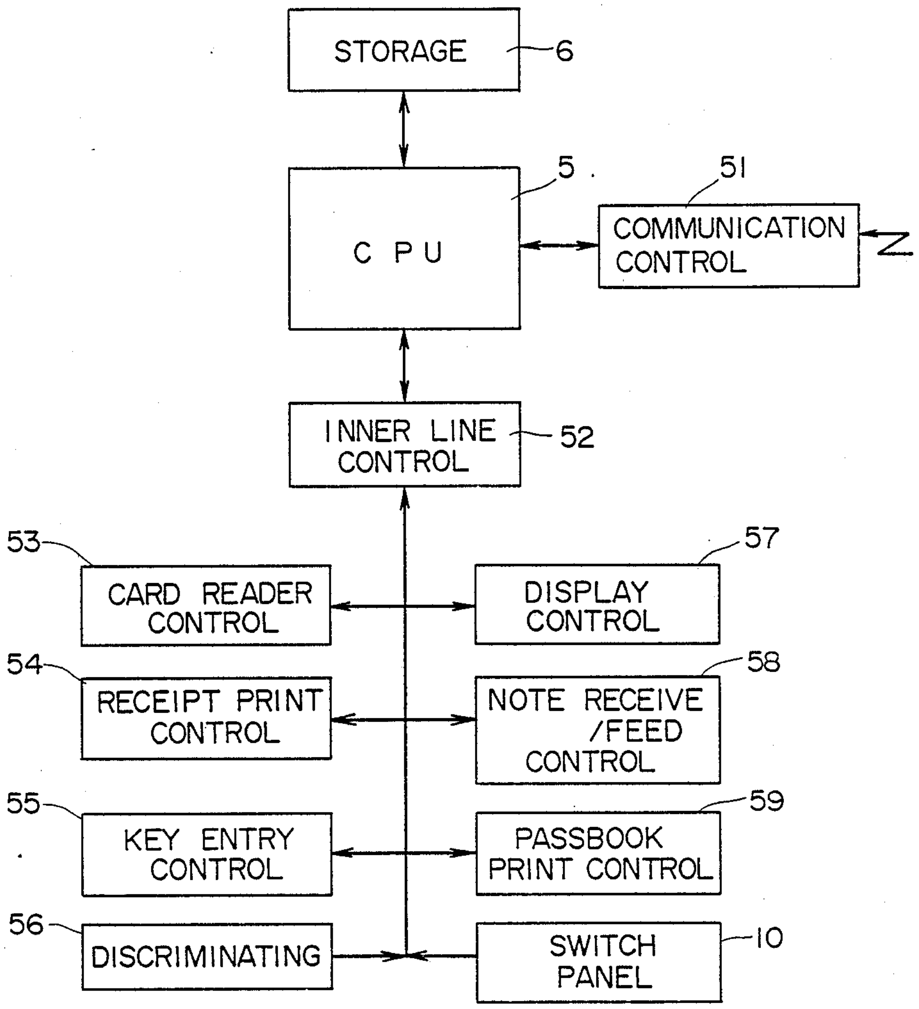
FIG. 7 is a schematic block diagram of the automatic transaction terminal of this embodiment.

Referring to FIG. 7, there is shown a schematic block diagram of an automatic transaction terminal which includes a preset switch panel 10 as a preferred embodiment of this inention. The preset switch panel 10 is shown in FIG. 2, and disposed to preset denominations of the respective bank note cartridges 1 to 4 as shown in FIG. 1. FIGS. 3 to 6 show preset examples by the preset switch panel 10. One feature of this embodiment will be described hereinafter in conjunction with FIGS. 1 through 6.

As shown in FIG. 1, the terminal of FIG. 7 includes A cartridge 1, B cartridge 2, C cartridge 3, and D cartridge 4. The preset switch panel 10 further includes switches 11 to 14, 21 to 24, 31 to 34, and 41 to 44 to preset the denominations to be assigned to the A, B, C, and D cartridges, respectively.

The switches 11, 21, 31 and 41 are disposed to preset that $100 bills are stored, switches 12, 22, 32 and 42 preset that $10 bills are stored, switches 13, 23, 33 and 43 preset that $50 bills are stored, and switches 14, 24, 34 and 44 preset whether new or old bills should be stored. The switches on the panel 10 may be exemplarily preset to the patterns shown in FIGS. 3 to 6.

Figure 3:
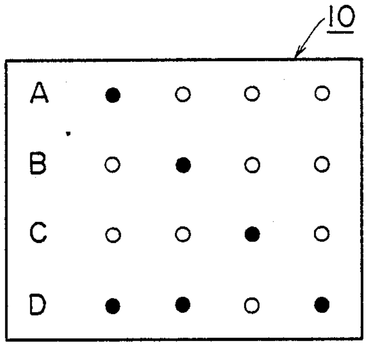
FIGS. 3 to 6 represent several preset examples of the preset switch panel shown in FIG. 2.

In the pattern of FIG. 3, A cartridge 1 stores $100 bills, B cartridge 2 stores $10 bills, C cartridge 3 stores $50 bills, D cartridge 4 stores $100, $10 and old bills. This pattern is useful when many old bills are predicted to be collected by this automatic transaction terminal.

Figure 4:
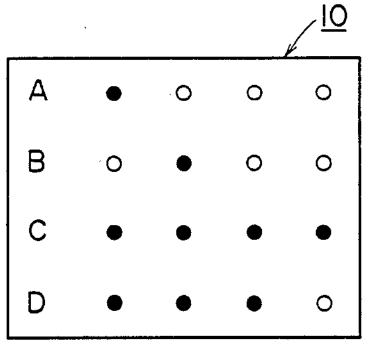

In the pattern of FIG. 4, the A cartridge stores $100 bills, the B cartridge stores $10 bills, the C cartridge stores $100, $10, $50 and old bills, and the D cartridge stores $100, $10, $50. This pattern is recommended to be set where deposit transactions are often executed, and allows that even if the A and B cartridges are filled with $100 and $10 bills respectively, and C and D cartridges can still store the $100 and $10 bills to accept further deposit transactions.

Figure 5:
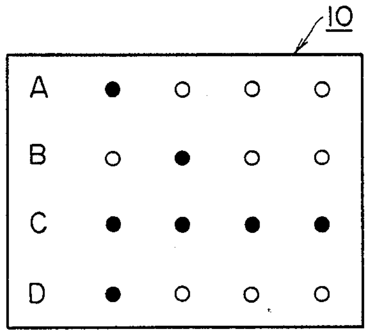

In the pattern of FIG. 5, the A cartridge stores $100 bills, the B cartridge stores $10 bills, the C cartridge $100, $10, $50 and old bills, and the D cartridge stores $100 bills. This pattern is recommended to be preset when many withdrawal transactions are predicted to be executed like a payday since $100 bills may be fully stored in the A and D cartridges which may dispense $100 bills.

In the pattern of FIG. 6, the A cartridge stores $100 bills, the B cartridge stores $10 bills, the C cartridge stores $100, $10, $50 and old bills, and the D cartridge stores $10 bills. This pattern is useful to be preset when the terminal is installed in the area where the $10 withdrawal transactions are often executed from the cartridges B and D.

The above-mentioned preset patterns shown in FIGS. 3 to 6 are merely illustrative, and any other patterns may be preset in accordance with the actual operations in a bank.

Figures 8, 9, 10, 11:
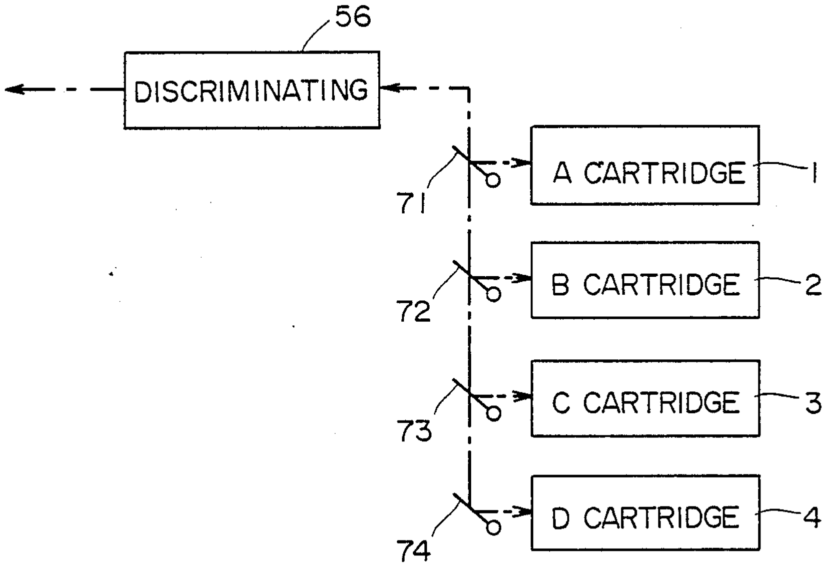
FIGS. 8 to 10 illustrate data map stored in a storage of the terminal shown in FIG. 7.
FIG. 11 exemplarily illustrates the connection between a discriminating unit and the respective cartridges.

Referring to FIG. 7, the automatic transaction terminal includes a storage 6 which stores data as shown in FIGS. 8 to 10. The storage map of FIG. 8 represents preset patterns of set bits for the cartridges 1 to 4. FIG. 9 illustrates the bits of a deposited note, and FIG. 10 illustrates the bits representing a bank note to be dispensed. FIG. 11 shows a discriminating member 56 associated with the cartridges 1 to 4.

The terminal further includes CPU 5 associated with the storage 6, a communication control unit 51 and an inner line control unit 52. The storage 6 stores an operation program to execute withdrawal, deposit and other requested transactions, and includes storage areas for storing bits as illustrated in FIGS. 8 through 10. In other words, the storage 6 includes storage areas 61 through 64 for storing the set bits for cartridges illustrated in FIG. 8, a storage area 65 for storing the bits representing the deposited bank note as shown in FIG. 9, and a storage area 66 for storing the bits representing the bank note to be dispensed.

The storage areas 61 to 64 store the bits representing the designation among $100, $10, $50 and old bills to be stored in the cartridges in accordance with the switches 11 to 14, 21 to 24, 31 to 34, and 41 to 44 disposed on the preset switching panel 10. The storage area 65 stores the bits representing that the deposited bank note is $100, $10, $50 or old bill as illustrated in FIG. 9. The storage area 66 stores the bits representing that the bank note to be dispensed is $100 or $10 bill as illustrated in FIG. 10.

The communication control unit 51 is disposed to transfer data between a host computer of a bank and the automatic transaction terminal. The CPU 5 is connected through the inner line control unit 52 with card reader control unit 53, receipt print control unit 54, key entry control unit 55, discriminating unit 56, display control unit 57, note receive-and-feed control unit 58, bank passbook print control unit 59, and switch panel 10.

The card reader control unit 53 is adapted to read the card data recorded on a card inserted into the terminal. The receipt print control unit 54 is adapted to control the printing operation to print receipts. The key entry control unit 55 controls a keyboard through which a customer enters his PIN code, deposited amount or withdrawn amount. The discriminating unit 56 discriminates the deposited bank notes with respect to denominations. The display control unit 57 controls the display to guide the customer to access the terminal.

The bank note receive-and-feed control unit 58 controls the operations for storing the notes discriminated by the discriminating unit 56 into one of the cartridges 1 through 4 and for feeding out the notes from one of the cartridges. Distribution flappers 71 through 74 are respectively disposed corresponding to the cartridges 1 through 4 so as to be controlled by the note receive-and-feed control unit 58 to execute the receive and feed operations for the cartridges 1 through 4. The bank passbook print control unit 59 controls the operations for printing data on the inserted passbook.

Figure 12:
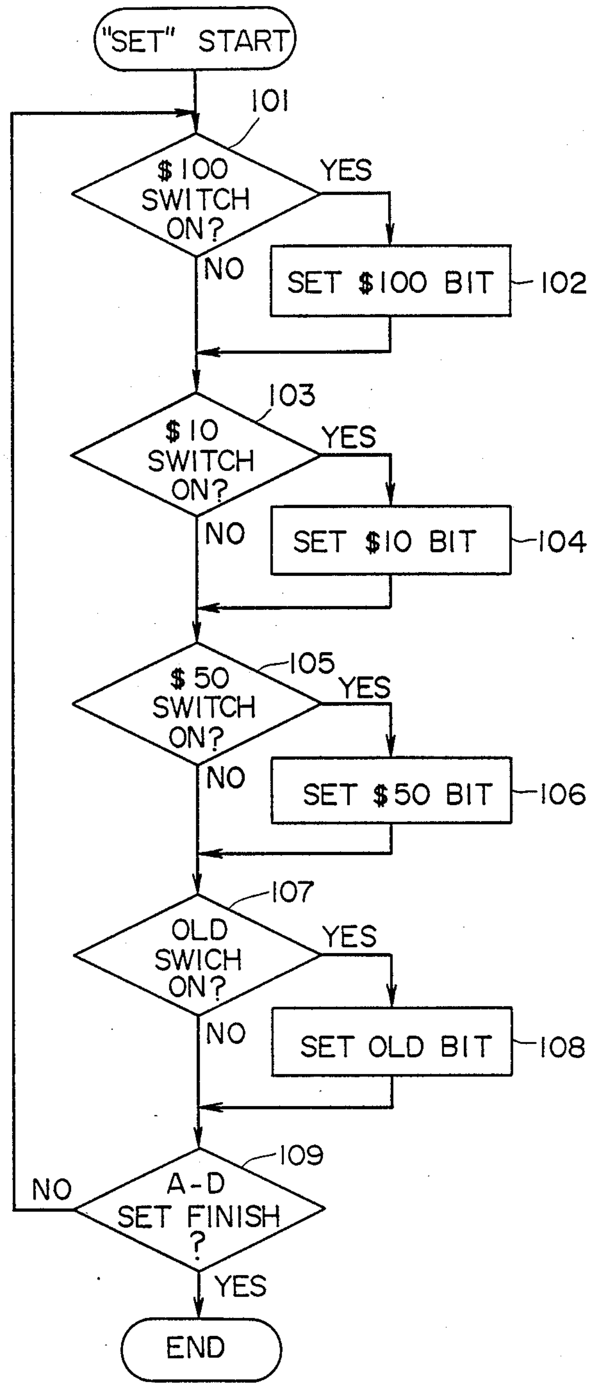
FIG. 12 is a flow chart of the terminal to preset the denominations to be assigned to the respective cartridges.
Figure 13:
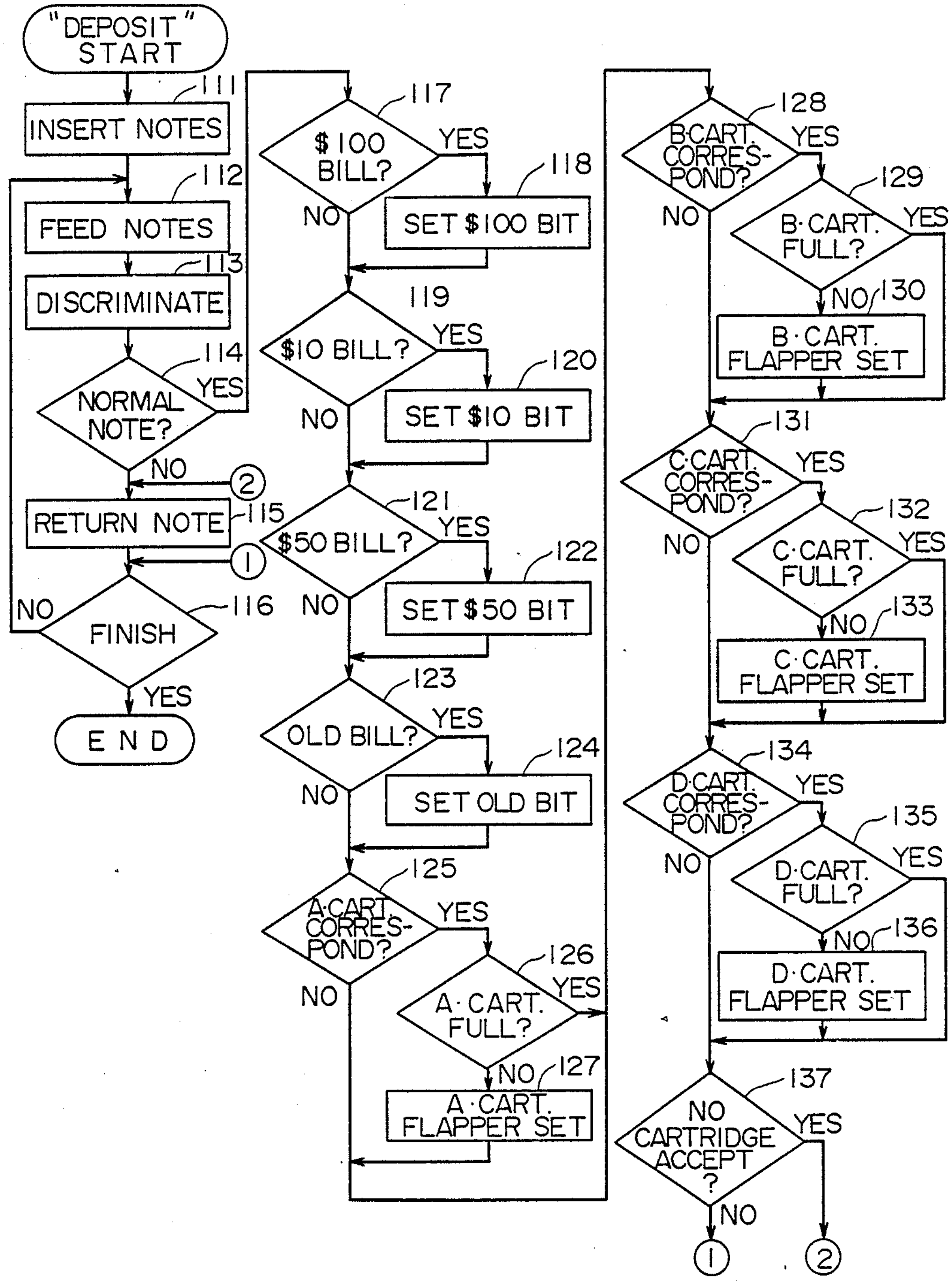
FIG. 13 is a flow chart of the automatic transaction terminal of this embodiment to execute a deposit transaction.
Figure 14:
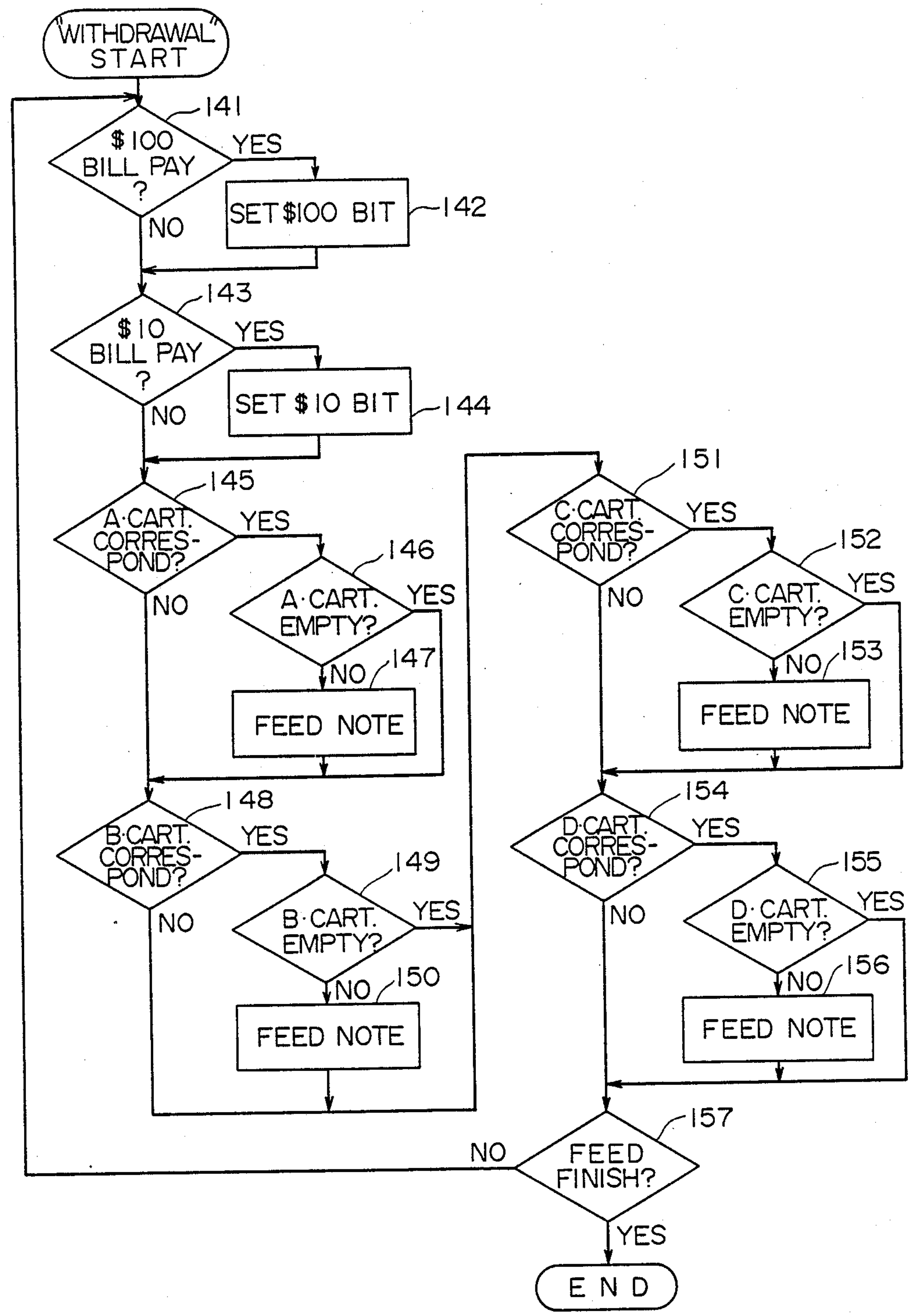
FIG. 14 is a flow chart of the terminal to execute a withdrawal transaction.

FIG. 12 is a flow chart to illustrate a preset operation, FIG. 13 is a flow chart to illustrate a deposit transaction operation, and FIG. 14 is a flow chart to illustrate a withdrawal transaction operation.

The operations of the automatic transactions terminal according to this embodiment of the invention will be described hereinafter.

In order to preset into the storage areas 61 to 64 of the storage 6 the bits representing which notes should be stored into the respective cartridges 1 to 4, the switches 11 to 14, 21 to 24, 31 to 34 and 41 to 44 on the panel 10 shown in FIG. 2 are manually actuated to be turned on corresponding to the notes to be stored into the respective cartridges.

In FIG. 12 the CPU 5 starts to judge whether the switch 11 corresponding to $100 bills in the A cartridge 1 is turned on (Step 101), and, if turned on, the bit representing $100 is set in the storage area 61 (Step 102). If the switch 12 corresponding to $10 bills is turned on (Step 103), the bit representing $10 is set in storage area 61 (Step 104). If the switch 13 corresponding to $50 bills is turned on (Step 105), the bit representing $50 is set in storage area 61 (Step 106). Moreover, if the switch 14 for selecting new or old note is turned on (Step 107), the bit representing old bills is set to the storage area 61 (Step 108). Thus, the CPU 5 judges whether the respective bits are finished to be set to all cartridges 1 to 4 (Step 109). Unless finished, the respective bits of the B cartridge 2 are set. By repeating this operation, the bits are subsequently set to the all storage areas including the area 64 in the D cartridge 4.

Referring to FIG. 13, deposit transaction operation will be described hereinafter. Upon the insertion of bank notes through a note inlet (not shown in drawings) of the terminal in a Step 111, the note receive-and-feed control unit 58 transports an inserted note to the discriminating unit 56 to be discriminated thereby in Steps 112 and 113. The unit 56 applies the results of the discrimination to the CPU 5 through inner line control unit 52, and in a Step 114 the CPU 5 judges whether the inserted note is genuine. If not genuine, the inserted note is returned to the note inlet (Step 115). In a Step 116, it is inquired whether the transaction is finished, and, if not yet finished, the subsequently inserted note is transported to the discriminating unit 56.

If the discrimination of the note shows genuine (Step 114), the sequence flows to a Step 117. If the note is a $100 bill, the bit representing a $100 bill is stored in the storage area $65 (Step 118). If $10 bill is found, the bit representing the bill is stored in the same (Step 120). If the note is a $50 bill, the bit representing the bill is stored (Step 122). If the note is an old bill, the bit representing the old bill is stored (Step 124). The CPU 5 judges whether the note corresponding to the bit stored in the area 65 should be stored in the A cartridge 1 (Step 125). This judgement is made by investigating whether or not the bit corresponding to the note is stored in the areas 61 through 64 based on the bit in the storage area 65 representing the denomination of the deposited note.

For instance, if the bit representing $100 bills to be stored in the A cartridge 1 is stored in the area 61 and the bit representing that the deposited note is $100 is stored in the area 65, it is inquired whether the A cartridge 1 is full (Step 126). Unless full, the note receive-and-feed control unit 58 actuates the distribution flapper 71 so that the $100 bill discriminated by the discriminating unit 56 is stored into the A cartridge 1 (Step 127). If the A cartridge is full, the CPU judges whether the bit representing the denomination of the deposited note which is stored in the storage area 65 exists in the areas 62 to 64. In other words, which cartridge, 2, 3 or 4, is available to store the deposited note. If the D cartridge 4 is designated to store the note, whether the D cartridge is full is inquired (Step 135). Unless full, the distribution flapper 74 corresponding to the D cartridge is actuated to store the $100 bill therein (Step 136). If the deposited note is not available to be stored in any cartridge, for instance, if it is not authentic, the note is returned to the note inlet (Step from 137 to 115).

Thus, if a $10 bill is inserted through the note inlet, the unit 56 discriminates the note to store the bit for $10 bill in the area 65. Further, the cartridge corresponding to the →10 is searched so that unless the cartridge is full, the flapper corresponding to the cartridge is actuated to store the →10 bill into the cartridge.

FIG. 14 shows the withdrawal transaction operation. Upon the actuation of a keyboard by a customer to request a withdrawal transaction, for instance →100 bills, the data representing the withdrawal amount are applied to the CPU 5 through the key entry control unit 55 and the inner line control unit 52. The CPU 5 judges whether the payment by →100 bills is requested (Step 141), and if →100 bills are requested, stores the bit representing a →100 bill into the area 66 of the storage 6 (Step 142). If the payment by →10 bills is requested, the bit representing a →10 bill is stored (Steps 143 and 144). Then, the CPU 5 finds one of areas 61 to 64 which stores the bit stored in the area 66. In other words, the CPU 5 judges whether →100 bills are stored in the A cartridge 1 by finding if the bit representing →100 bill is stored (Step 145).

If the A cartridge 1 is judged to be storable for →100 bills, whether the cartridge 1 is empty is inquired (Step 146). Unless empty, →100 bills stored in the A cartridge are fed out (Step 147). If empty, whether →100 bills are stored in the B cartridge 2 is inquired, and the storage of $100 bills in the cartridge 2 is inquired (Step 148). Unless the B cartridge is empty (Step 149), $100 bills are fed out from the B cartridge 2 (Step 150). If empty, the storage of $100 bills in the C cartridge 3 is inquired (Step 151). Unless the C cartridge stores $100 bills (Step 152), the storage of $100 bills in the D cartridge 4 is inquired (Step 154). Unless the D cartridge is empty, a 100 bill is fed out (Step 156). Thus, whether all notes to be withdrawn are fed out is inquired (Step 157), and unless such feed is completed, the denomination of the note to be withdrawn is further reviewed and the note if fed out from the corresponding cartridge.

In this embodiment, the feeding out in withdrawal transactions is performed only from the cartridge storing a single denomination of notes. If desired, however, a modifying the construction of a note transportation route so as to pass the notes from the cartridge through the discriminating unit 56, the cartridge storing several denomination of notes, such as C cartridges in FIG. 4, may be used to feed the note to be withdrawn. For instance, if a $100 bill is requested to be withdrawn and the C cartridge 3 is judged by the CPU 5 to store $100 bills under the preset pattern shown in FIG. 4, the C cartridge feeds out a note to be dispensed therefrom and reviewed by the discriminating unit 56. If the fed out note is found by the unit 56 to be a →100 bill, the note is dispensed from the terminal. If the note is not →100 bill, the note is restored to the original C cartridge 3 and until a →100 bill is found by the unit 56, the notes stored in the C cartridge 3 are fed out subsequently. According to this modified embodiment, a further versatile combination of denominations in withdrawal transactions are performed.

In view of the foregoing embodiment of this invention, it is apparent that since the denominations of the bank notes to be stored in a plurality of cartridges may be flexibly set, the number of cartridges for deposit or withdrawal transactions may be freely selected according to the frequency of such transactions to be accessed by customers in each service area. On a payday or the day when many withdrawal transactions are predicted, the number of the cartridges for withdrawal transactions may be increased, so that the times of service for maintaining the notes to be stored or taken out may be reduced.

Though the preset patterns for denominations assigned to the cartridges are performed by manual switch panel according to the foregoing embodiments as shown in FIG. 2, they may be modified to be set by using a portable memory or card where a predetermined pattern for denominations is stored to be read out by the automatic transaction terminal.

It should be understood that the above description is merely illustrative of this invention and many advantages and modifications may be made by those skilled in the art without departing from the scope of the appended claims.

What is claimed:

1. An automatic transaction terminal comprising:

a plurality of cartridges for each storing bank notes of at least one denomination, note distributing means for performing at least one of storing notes in the respective cartridges and feeding out stored notes from respective cartridges, control means for controlling operation of said note distributing means; and note presetting means, commonly associated with all of said cartridges, for selectively presetting a pattern representing the denominations of the notes to be stored in each of the respective cartridges, said presetting means containing a plurality of individual signal storage elements which are grouped into sets such that each set is dedicated to a respective single one of said cartridges, said storage elements comprising mechanical on/off switch elements wherein on or off positions of said switch elements define said preset pattern representing said denominations of the notes to be stored in respective ones of said cartridges, each switch element defining a preset electrical state, the electrical states of said grouped storage elements defining said preset pattern by said on or off positions of said switch elements, said control means including means for reading said preset pattern defined by the preset electrical states of said grouped storage elements from said note presetting means, storing said preset pattern, and utilizing said stored preset pattern to control operation of said note distributing means so that each of said cartridges may store or feed out the note having the denomination preset by said presetting means through said note distributing means.

2. An automatic transaction terminal according to claim 1 further comprising means for accepting a deposited note, and discriminating means for determining the denomination of a deposited note, said note distributing means being operative by said control means to store a note whose denomination is found by said discriminating means into a cartridge which is designated by said stored preset pattern as storing notes of that denomination.

3. An automatic transaction terminal according to claim 1 further comprising key entry means for entering a withdrawal amount and the denominations of notes for a withdrawal transaction, said note distributing means operating to feed out a note having a denomination designated by said key entry means from a cartridge designated by said stored pattern as containing notes of that denomination.

* * * * *